(No Model.)
E. S. SNYDER.
INSERTIBLE SAW TOOTH.
No. 353,385. Patented Nov. 30, 1886.
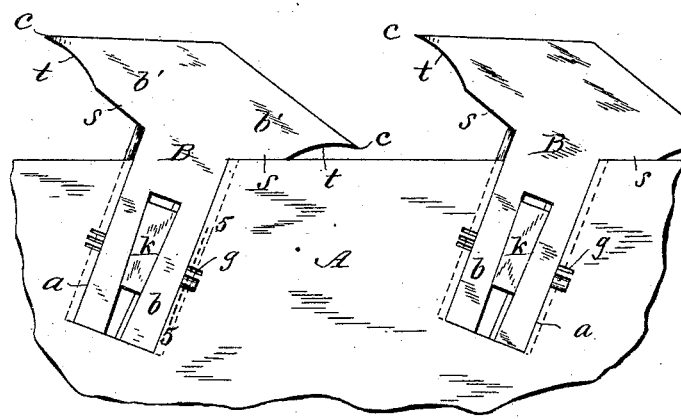
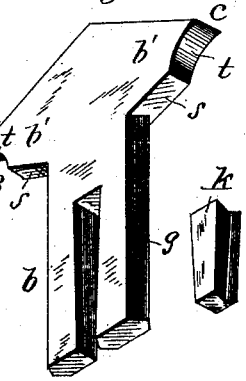
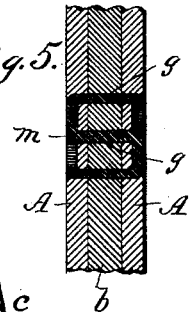
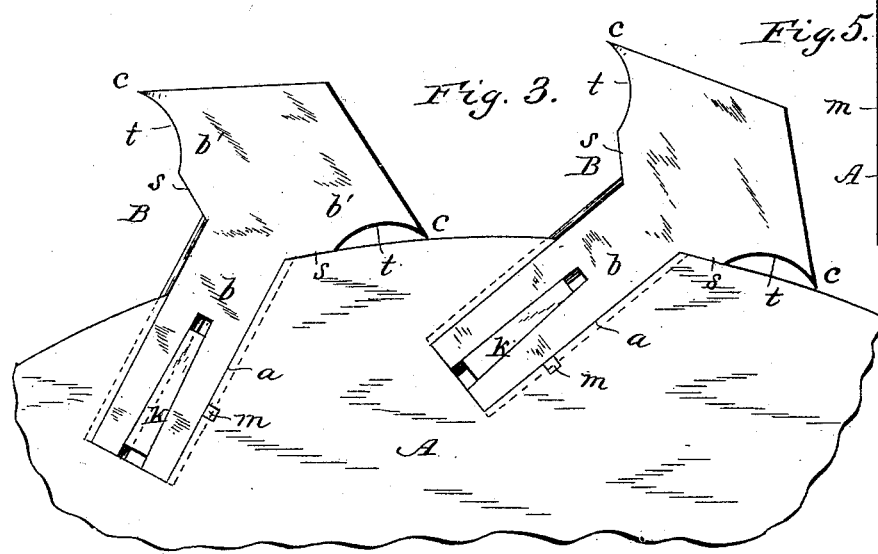
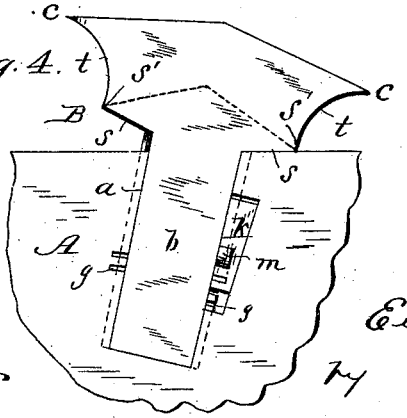
Witnesses:
Chas. L. Taylor
E. D. Smith
Inventor:
Elisha S. Snyder,
by H. N. Low
attorney.
N. PETERS, Photo-Lithographer, Washington, D. C.

UNITED STATES PATENT OFFICE.

ELISHA S. SNYDER, OF SNYDER'S MILLS, WEST VIRGINIA.

INSERTIBLE SAW-TOOTH.

SPECIFICATION forming part of Letters Patent No. 353,385, dated November 30, 1886.

Application filed June 24, 1886. Serial No. 206,118. (No model.)

*To all whom it may concern:*

Be it known that I, ELISHA S. SNYDER, a citizen of the United States, residing at Snyder's Mills, in the county of Jefferson and State of West Virginia, have invented certain new and useful Improvements in Saw-Teeth; and I do declare the following to be a full, clear, and exact description of the invention, such as will enable others skilled in the art to which it appertains to make and use the same.

My invention relates to that class of circular or straight saws in which the teeth are detachable.

The object of the invention is to provide a saw-tooth which, while capable of being held rigidly and immovably in the blade, may be reversed when too much worn, and again secured with a new edge in cutting position. The tooth is also made adjustable in the blade, to bring the cutting-edge to the required distance therefrom, is peculiarly shaped, as is hereinafter more fully described, to give strength and durability, and is provided with improved means of fastening to the blade.

The invention can best be understood by reference to the accompanying drawings, in which I have shown means for carrying it into effect.

In said drawings, Figure 1 is a side view of a portion of a straight saw embodying my invention. Fig. 2 is a perspective view of one of the teeth detached, with the key by which it may be secured. Fig. 3 is a side view of a portion of a circular saw, showing also a somewhat different means for securing the teeth. Fig. 4 is a side view showing another means. Fig. 5 is a sectional view, enlarged, on line 5 5, Fig. 1, showing another means for said purpose.

Referring to the drawings, A indicates the saw-blade, which may be straight, as shown in Fig. 1, or circular, as shown in Fig. 3. The blade is provided with sockets $a$, adapted to receive the shanks $b$ of the detachable teeth B. The edges of the sockets and shanks are correspondingly shaped, so as to form ways by which the shanks in applying, removing, or adjusting the teeth move longitudinally, but which prevent any lateral movement of the teeth. As shown, these ways are V-shaped, the edges of the shanks being convex and of the sockets concave.

The tooth is substantially T-shaped, having a head composed of two arms, $b'$, extending in opposite directions. At the extremity of each arm $b'$ is formed a cutting-edge, $c$.

The two halves of the tooth upon each side of the cutting-edge are symmetrical. The tooth may therefore be placed in the socket in either of two positions, and the sockets being inclined to the line of the saw edge either of its arms $b'$ and cutting-edges brought into position to act as a tooth. The other arm, by reason of the inclination of the socket, inclines inward toward the blade.

To strengthen the tooth and make it firmer in the blade, the arms $b'$ are each provided at their bases with a shoulder, $s$, so placed that the lower shoulder or that of the rearmost arm will rest upon and coincide with the edge of the blade. Below each cutting-edge, and between the edge and the shoulder $s$, is formed a throat, $t$, to facilitate the cutting by said edge.

As the cutting-edges in action become worn away the teeth are reversed, bringing the other edge into play. When the teeth are sharpened, the throats $t$ are preserved as long as possible; but when too much worn the teeth are ground in shape, (indicated by dotted lines in Fig. 4,) thus bringing into action the angle $s'$, the space beneath the forward shoulder, $s$, serving as a throat for the clearance of the edge.

Various means may be used for securing the shank of the tooth in the socket of the blade. I have shown several ways of applying a key, $k$, for this object. I am, however, aware that a key has been heretofore used to secure detachable teeth in saw-blades, and I do not claim a key, broadly, so applied.

In Figs. 1 and 5 I have shown another means for securing the shank. In this instance the edge of the shank and of the socket are provided with a series of transverse grooves, $g$, several of which will correspond with each other in various positions of the shank—that is to say, the shank may be more or less deeply inserted in the socket to bring its cutting-edge into the proper position, at the same time bringing several of said grooves into line. Through these grooves I lace back and forth the necessary number of times to give the proper strength a strip of sheet metal, $m$. This will hold the tooth in place against any ordinary strain. In case of such strain as would break the tooth or blade, the detachment of the tooth may be permitted by making the lacing of the proper degree of weakness. The lacing $m$ may be applied directly between the tooth and blade, or through the medium of the key, as shown in Fig. 4. In either event it will operate to hold the shank in place. The lacing may be applied between the key and shank, as shown in said Fig. 4, or it may be applied between the key and socket. That cutting-edge $c$ which is placed in position for action will be upset to increase its width beyond the width of the rest of the tooth or of the blade, to give the necessary clearance for these parts. The edge which is not in action will remain by preference of the same width as the blade. I prefer not to upset this latter edge until the tooth is reversed, that it may not impede the saw or roughen the lumber by grazing the sides of the cut produced by the saw.

I am aware that a tooth having two cutting-edges has been pivoted to oscillate in a plate and the latter secured in a saw-blade, for the purpose of cutting in either direction by changing the direction of rotation of the saw, thus saving the time of the back travel of the carriage, and I do not wish my claim to be understood as extending to such construction.

In using the words "substantially straight shank" it is my intention to distinguish from the above-mentioned tooth, the shank of which was made circular to oscillate in its seat.

Having thus described my invention, what I claim, and desire to secure by Letters Patent of the United States, is—

1. The combination of a saw-blade having a socket formed entirely within the blade, a saw-tooth provided with two opposite cutting-edges, a shank having straight opposite edges adapted to fit any part of the socket when adjusted inward or outward, said shank being expansible, and a key for expanding the same, substantially as set forth.

2. A saw-tooth having a straight shank, two oppositely and similarly inclined straight shoulders, $s$, curved throats $t$, beyond said shoulders, and two opposite cutting-edges, $c$, in combination with a straight blade having a socket inclined at the same angle as are the shoulders $s$, the blade being thereby adapted to support one shoulder and to elevate the opposite cutting-edge and angle $s'$, substantially as set forth.

3. The combination of a saw-blade having a socket, a tooth having a shank and a series of grooves, and a soft flexible material in narrow form laced back and forth through said grooves, and through corresponding grooves in an opposing part, substantially as described.

4. The combination of a saw-blade having a socket, a tooth having a shank adapted to fit said socket, and having a series of recesses or grooves, a key bearing against the shank opposite said recesses, and having a series of similar recesses, and a soft material, substantially as described, engaged with those recesses of the shank and key which correspond when said parts are adjusted, substantially as described.

In testimony whereof I affix my signature in the presence of two witnesses.

ELISHA S. SNYDER.

Witnesses:
H. N. LOW,
M. P. CALLAN.